(12) United States Patent
Chamoun (10) Patent No.: US 8,439,612 B2
(45) Date of Patent: May 14, 2013

(54) CARGO CONTROL SYSTEM ADAPTOR

(76) Inventor: Teffy R. Chamoun, Sycamore, IL (US)

( * ) Notice: Subject to any disclaimer, the term of this patent is extended or adjusted under 35 U.S.C. 154(b) by 234 days.

(21) Appl. No.: 12/847,587

(22) Filed: Jul. 30, 2010

(65) Prior Publication Data
US 2011/0027034 A1 Feb. 3, 2011

Related U.S. Application Data

(60) Provisional application No. 61/230,013, filed on Jul. 30, 2009.

(51) Int. Cl.
*B60P 7/08* (2006.01)
(52) U.S. Cl.
USPC ............ 410/121; 410/94; 410/89; 410/3; 410/150
(58) Field of Classification Search .......... 410/121, 410/143, 30, 140, 89, 49, 3, 94, 129, 130, 410/150, 151; 211/22; 188/32; 224/322, 224/42.33, 403, 404; 248/351, 354.5
See application file for complete search history.

(56) References Cited

U.S. PATENT DOCUMENTS 2,546,929 A * 3/1951 Nampa .................... 410/147
4,236,854 A * 12/1980 Rogers .................... 410/121

* cited by examiner

*Primary Examiner* — Stephen Gordon
(74) *Attorney, Agent, or Firm* — Husch Blackwell LLP (57) ABSTRACT

An adaptor for cargo control systems is provided that can adjust to accommodate length, width, and height variances between parallel tracks in a cargo control system. The adaptor includes a crossbar, first and second length and height adjusting mechanisms, and first and second width adjusting mechanisms. The first and second length and height adjusting mechanisms are affixed to first and second ends of the crossbar, and the first and second width adjusting mechanisms are affixed to the crossbar along the length of the crossbar.

12 Claims, 7 Drawing Sheets

CARGO CONTROL SYSTEM ADAPTOR

CROSS-REFERENCE TO RELATED APPLICATIONS

This application claims priority to and incorporates by reference U.S. Provisional Patent Application No. 61/230,013 filed Jul. 30, 2009 titled "Cargo Control System Adaptor."

FIELD OF INVENTION

The present invention generally relates to cargo control systems. More particularly, the present invention relates to adaptors used in connection with cargo control systems.

BACKGROUND

Cargo control systems known to those of skill in the art can employ E-track, A-track, or O-track systems. In known systems, for example, an E-track system, E-tracks can be secured to the floor and/or wall of a trailer, truck, or other transportation device. The tracks can be secured to the floor or wall with bolts, screws, or other fastening mechanisms known by those of skill in the art.

Cargo, equipment, and other devices, such as wheel chocks, can be secured to the tracks of a cargo control system with tie down hardware and straps known to those of skill in the art. When secured to the tracks, the cargo is constrained in horizontal, vertical, lateral, and radial directions and remains stable during transit.

Known cargo control systems, such as an E-track system, can include segmented tracks, which are extended pieces of material having a length and a width. A first set of segmented tracks is secured to a trailer or truck, end to end, in a vertical direction along the length of the trailer to form a first track. A second set of segmented tracks is secured, end to end, along the length of the trailer to form a second track that is parallel to the first track. The tracks in a cargo control system can be made of steel, iron, aluminum or other materials as would be known by those of skill in the art.

A plurality of slots can be disposed in each segmented track along the length of the track. The slots can be any shape and size known to those of skill in the art. For example, in E-tracks, the slots are typically rectangular and can be situated either vertically or horizontally relative to the track. In A-track systems, the slots are typically circular slots connected by rectangular slots.

To secure cargo or other equipment to the tracks of a cargo control system, a user can engage tie down hardware known to those of skill. Tie down hardware can be associated with first and second ends of the cargo to secure the first and second ends of the cargo to first and second slots, respectively, in the tracks of the cargo control system. The first and second slots can be on the same track or parallel tracks, depending on the cargo being secured.

When cargo control systems are used in manner described above, users can experience difficulty because the length, width and height of the cargo do not always precisely align with the tracks of the system and the slots disposed therein. Accordingly, there is a need for an adaptor that can adjust for the variances between tracks used in a cargo control system. Preferably, such an adaptor adjusts for length, width, and height variances between parallel tracks in a cargo control system.

DESCRIPTION OF THE PREFERRED EMBODIMENTS

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include an adaptor that can adjust for the variances between parallel tracks used in a cargo control system. Preferably, an adaptor in accordance with the present invention can adjust to accommodate length, width, and height variances between parallel tracks in a cargo control system.

Specifically, the adaptor shown and described herein can be adjustable width-wise to accommodate variances in the spacing between tracks of a cargo control system and to accommodate variances in mounting points of equipment secured to the adaptor. The adaptor shown and described herein can also be adjustable length-wise to accommodate variances in the spacing between slots along the length of parallel tracks of a cargo control system. Further, the adaptor shown and described herein can be adjustable height-wise to accommodate variances in the height of tracks of a cargo control system relative to the floors on walls on which they are mounted.

It is to be understood that the adaptor shown and described herein can be used in connection with all types of cargo control systems, including E-track systems, A-track systems, and O-track systems. However, the adaptor shown and described herein is not limited to tracks used in these types of cargo control systems. Rather, the adaptor shown and described herein can be used in connection with systems using all different types of tracks.

Figure 1:
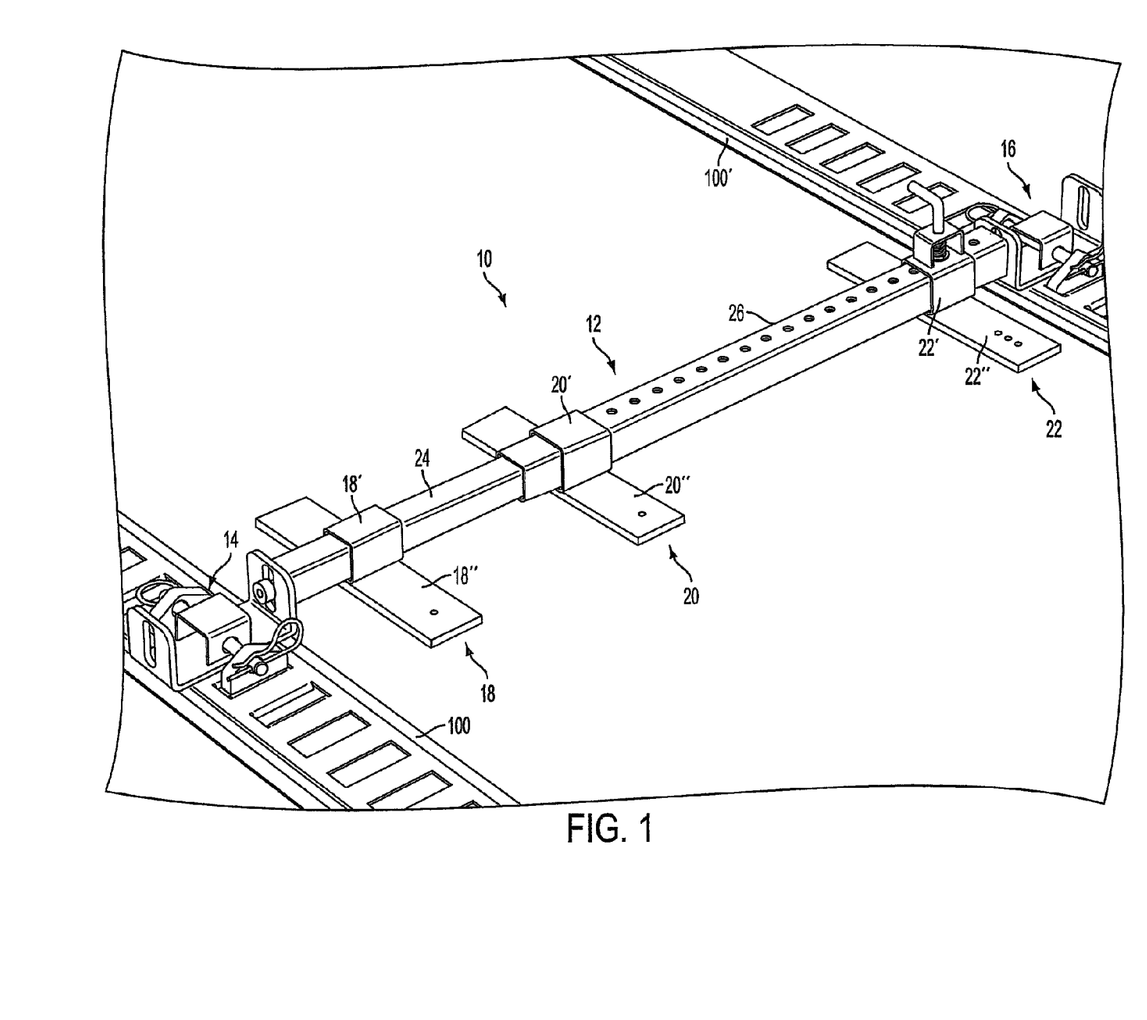
FIG. 1 is a perspective view of an adaptor in accordance with the present invention secured to parallel tracks of an E-track cargo control system.

FIG. 1 is a perspective view of an adaptor 10 in accordance with the present invention secured to first and second parallel tracks 100 and 100' of a cargo control system. As seen in FIG. 1, the tracks 100 and 100' are E-tracks.

The adaptor 10 can include a crossbar 12, first and second length and height adjusting mechanisms 14 and 16, and first, second and third width adjusting mechanisms 18, 20, and 22. The adaptor 10 and all elements thereof can be made from steel, iron, aluminum, plastic, a combination of these materials, or any other materials as would be known by those of skill in the art.

The crossbar 12 can include first and second slidably engaging tubular crossbars 24 and 26. The crossbar 12, including the first and second crossbars 24 and 26, can have a length and width and top, bottom, front and back sides. A cross-section of the crossbar 12, including the first and second crossbars 24 and 26, can be rectangular, square, round, ovular, or any other shape as would be known by those of ordinary skill in the art. In embodiments, the cross-section of the first crossbar 24 can be smaller than the cross section of the second crossbar 26 so that the first crossbar 24 can slide and fit into the second crossbar 26.

The crossbar 12, including the first and second crossbars 24 and 26, can aid in adjusting the adaptor 10 for width variances between the tracks 100 and 100' of the cargo control system. That is, the width of the adaptor 10 can be adjusted so that the adaptor 10 can be used with different cargo control systems having parallel tracks spaced apart at different distances.

For example, the first crossbar 24 can slide into the cross-section of the second crossbar 26 so that the width of the adaptor 10 can be adjusted for securing to the first and second parallel tracks 100 and 100'. The width of the adaptor 10 can be adjusted by adjusting the length of the crossbar 12. That is, the length of the crossbar 12 can be adjusted by sliding the first crossbar 24 into the second crossbar 26 until the desired length of the crossbar 12 is achieved.

Width adjusting mechanisms 18, 20, and 22 can also aid in adjusting the adaptor 10 for width variances between the tracks 100 and 100' of the cargo control system. That is, width adjusting mechanisms 18, 20, and 22 can be adjusted relative to each other and to the crossbar 12 to provide different and varying points along the crossbar 12 at which cargo, wheel chocks, or other equipment can be secured thereto.

For example, first, second, and third width adjusting mechanisms 18, 20, and 22, can be placed along the length of the crossbar 12. Each width adjusting mechanism 18, 20, and 22 can have a tubular first part 18', 20', and 22' that extends around the circumference of the crossbar 12 and a horizontal second part 18", 20", and 22" that extends below and perpendicular to the bottom side of the crossbar 12. In some embodiments, the horizontal second parts 18", 20" and 22" can sit on the floor or wall of the truck or trailer to which the tracks 100 and 100' are mounted.

As seen in FIG. 1, a first width adjusting mechanism 18 can be placed along the length of the crossbar 12 so that the first part 18' extends around the circumference of the first slidably engaging crossbar 24. The second and third width adjusting mechanisms 20 and 22 can be placed along the length of the crossbar 12 so that the first parts 20' and 22' extend around the circumference of the second slidably engaging crossbar 26.

Figure 5:
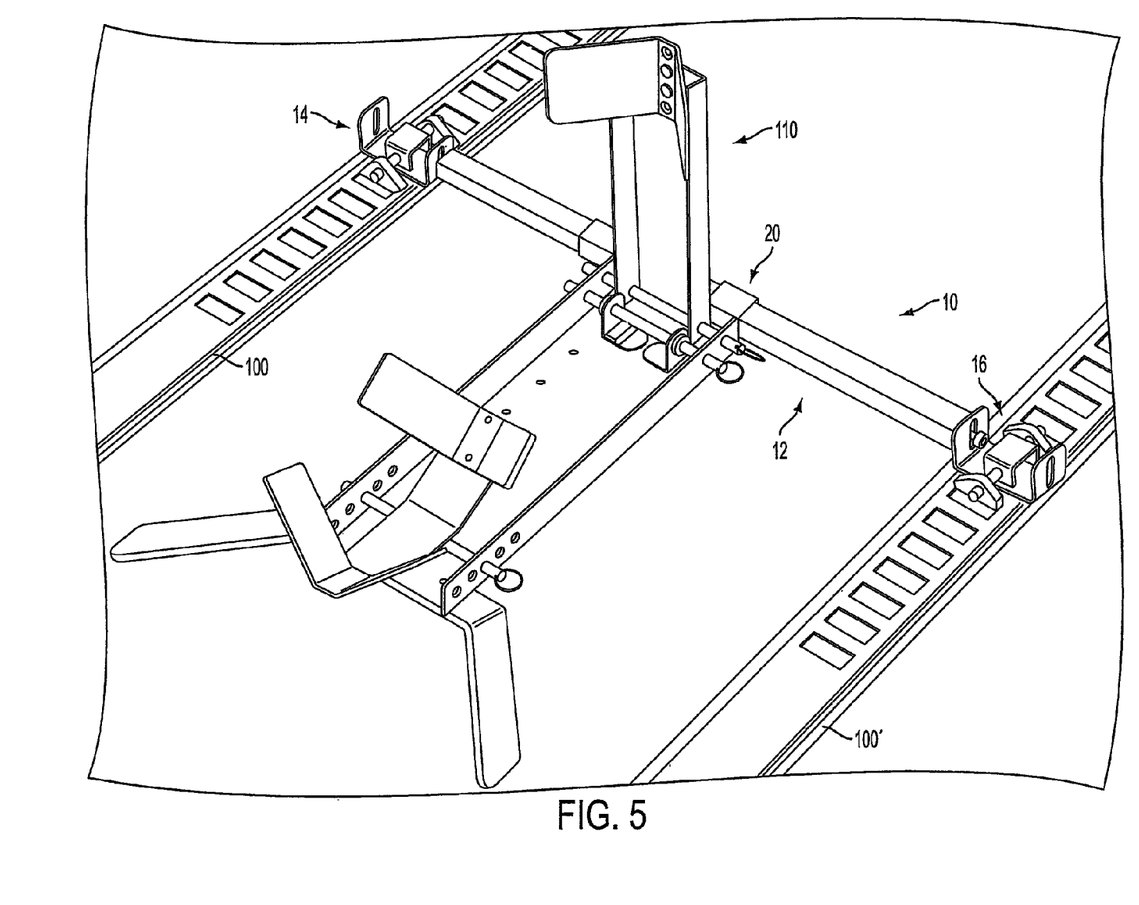
FIG. 5 is a perspective view of a first wheel chock secured to the adaptor of FIG. 1.
Figure 6:
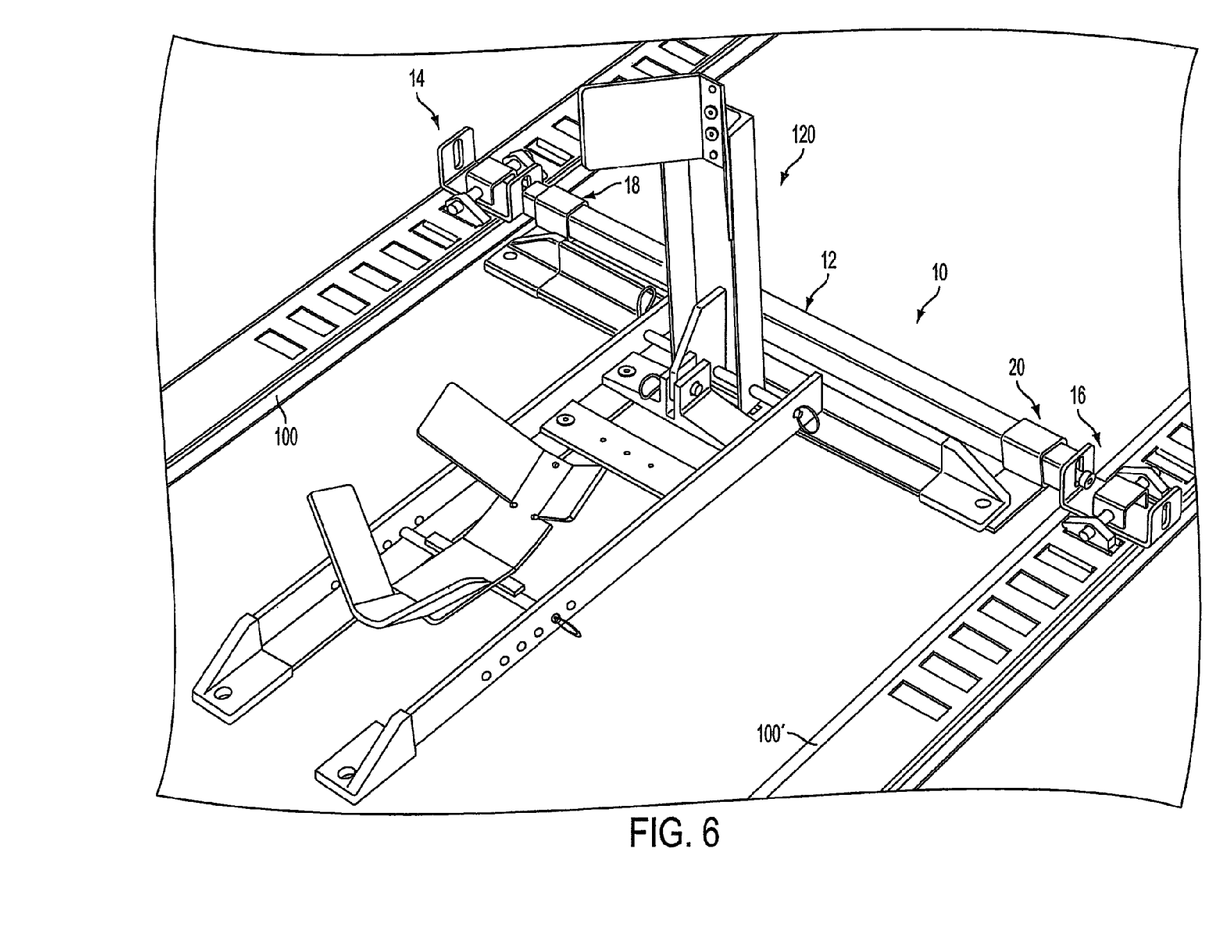
FIG. 6 is a perspective view of a second wheel chock secured to the adaptor of FIG. 1.

In some embodiments of the present invention, the adaptor 10 can include only two width adjusting mechanisms. For example, as seen in FIG. 5, the first (not shown) and second width adjusting mechanism 18 and 20 can be placed along the length of the crossbar 12 so that both of the tubular first parts 18' and 20' extend around the circumference of the second slidably engaging crossbar 26. As seen in FIG. 6, the first width adjusting mechanism 18 can be placed along the length of the crossbar 12 so that the tubular first part 18' extends around the circumference of the first slidably engaging crossbar 24. The second width adjusting mechanism 20 can be placed along the length of the crossbar 12 so that the tubular first part 20' extends around the circumference of the second slidably engaging crossbar 26.

Figure 3:
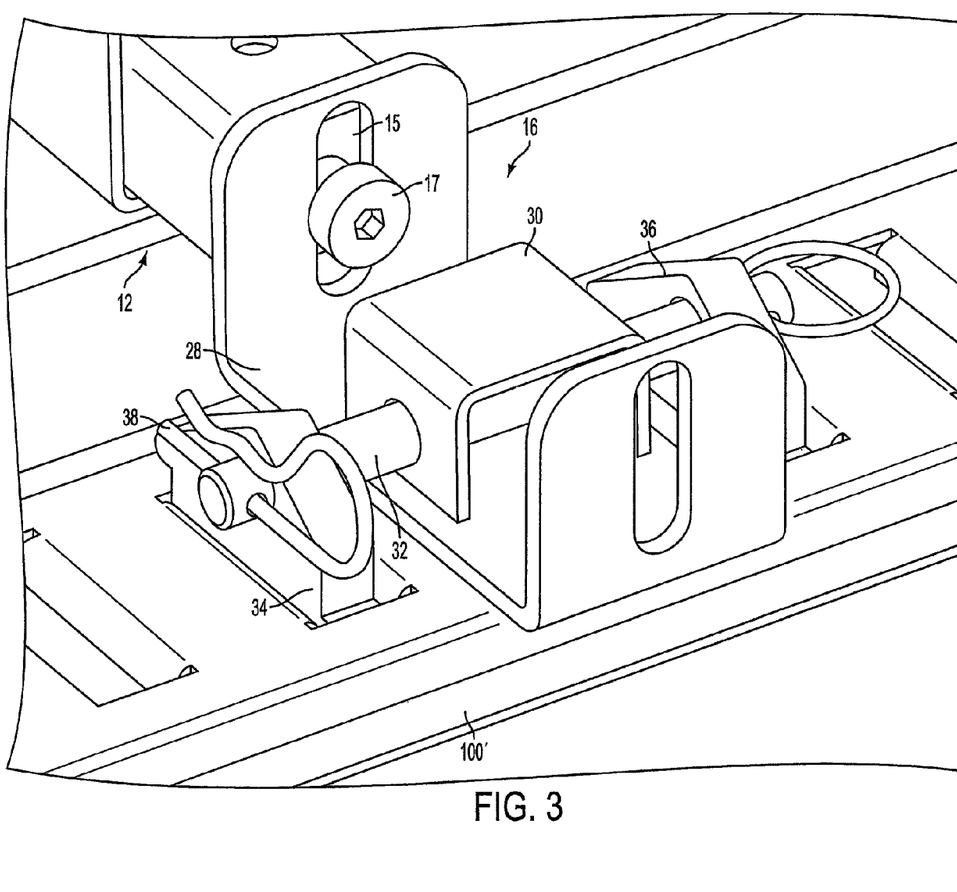
FIG. 3 is an enlarged view of a length and height adjusting mechanism of the adaptor shown in FIG. 1 secured to an E-track cargo control system.
Figure 4:
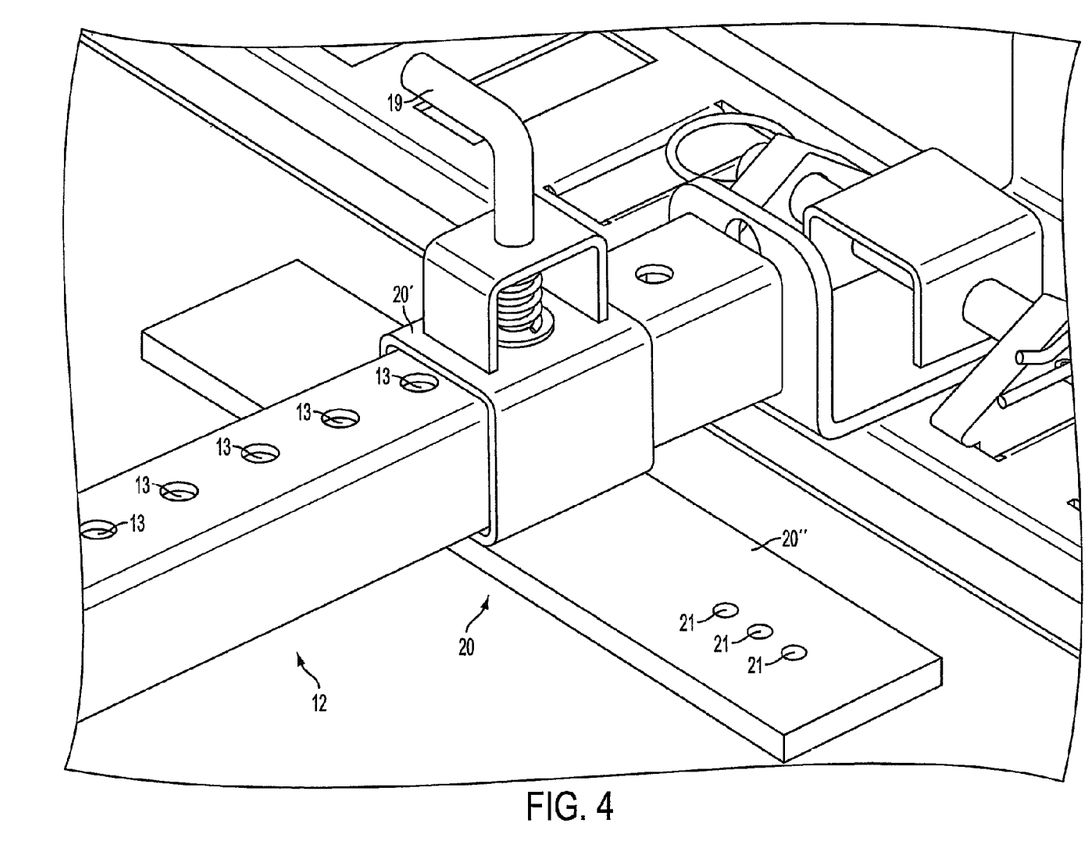
FIG. 4 is an enlarged view of a width adjusting mechanism of the adaptor shown in FIG. 1.

As best seen in FIG. 4, the crossbar 12, including one or both of the crossbars 24 and 26, can include a plurality of holes 13 disposed in the top side thereof. Similarly, the tubular first part of the width adjusting mechanisms can include a corresponding hole 13' disposed in the top side thereof. For example, as seen in FIG. 3, the tubular first part 20' of the second width adjusting mechanism can include a hole 13' disposed in the top side thereof.

A spring loaded screw 19 or other affixing mechanism known to those of skill in the art can extend through the holes 13 and 13' disposed in the top sides of the crossbar 12 and width adjusting mechanism 20. A user can pull on the screw 19 to load the spring associated with the screw 19 and disengage the screw 19 from the holes 13 and 13' in the crossbar 12 and width adjusting mechanism 20. Once the screw 19 is disengaged from the holes 13 and 13', the width adjusting mechanism 20 can slide along the length of the crossbar 12. A user can place the width adjusting mechanism 20 at the desired position along the length of the crossbar 12 by releasing the screw 19 so that the spring associated with the screw 19 is unloaded and the screw 19 engages the holes 13 and 13' in the width adjusting mechanism 20 and the crossbar 12. The screw 19 can extend through the holes 13 and 13' in both the width adjusting mechanism 20 and the crossbar 12 to hold the width adjusting mechanism 20 in place along the length of the crossbar 12.

In embodiments of the present invention in which the adaptor 10 includes first, second, and third width adjusting mechanisms 18, 20, and 22, any or all of the width adjusting mechanisms can move along the length of the crossbar 12 in the same manner described above and be secured in place along the length of the crossbar 12 in the same manner as described above.

In embodiments having either two or three width adjusting mechanisms, at least one of the width adjusting mechanisms, for example, the first width adjusting mechanism 18 can be fixedly secured to the crossbar 12 so that the first width adjusting mechanism 18 does not move along the length of the crossbar 12. Specifically, the first width adjusting mechanism 18 can be fixedly secured to the first slidably engaging crossbar 24.

The adjustability of at least one of the width adjusting mechanisms relative to the other width adjusting mechanisms and to the crossbar 12 provides the adaptor 10 with different points along its length at which cargo or other equipment can be secured thereto. For example, FIG. 5 shows a first wheel chock 110 secured to the second and third width adjusting mechanisms 20 and 22 of the adaptor 10 along a central portion of the crossbar 12. Alternatively, FIG. 6 shows a second wheel chock 120 secured to the first and third width adjusting mechanisms 18 and 22 of the adaptor 10 at opposing ends of the crossbar 12. Depending on the width of the wheel chock 110 or 120 used in connection with the adaptor 10 and the points at which the wheel chock 110 or 120 can attach to the adaptor 10, the width adjusting mechanisms 18, 20, and 22 can be placed at desired positions along the length of the crossbar 12. Thus, the adaptor 10 and the width adjusting mechanisms 18, 20, and 22 can accommodate a wide variety and sizes of wheel chocks or other cargo.

As best seen in FIG. 4, the horizontal second part of any of the width adjusting mechanisms, for example, the horizontal second part 20" of the width adjusting mechanism 20, can extend below and perpendicular to the bottom side of the crossbar 12 and include a plurality of holes 21 disposed therein. A wheel chock or other cargo can be secured to the adaptor 10 by aligning a hole in the mounting bar of the wheel chock 110 or 120 with a hole 21 in the width adjusting mechanism 20 and extending a bolt, screw, or other fastening mechanism through each hole. The plurality of holes 21 in the horizontal second part 20" of the width adjusting mechanism 20 can provide for adjustability depending on the thickness of the wheel chock mounting bar.

Figure 2:
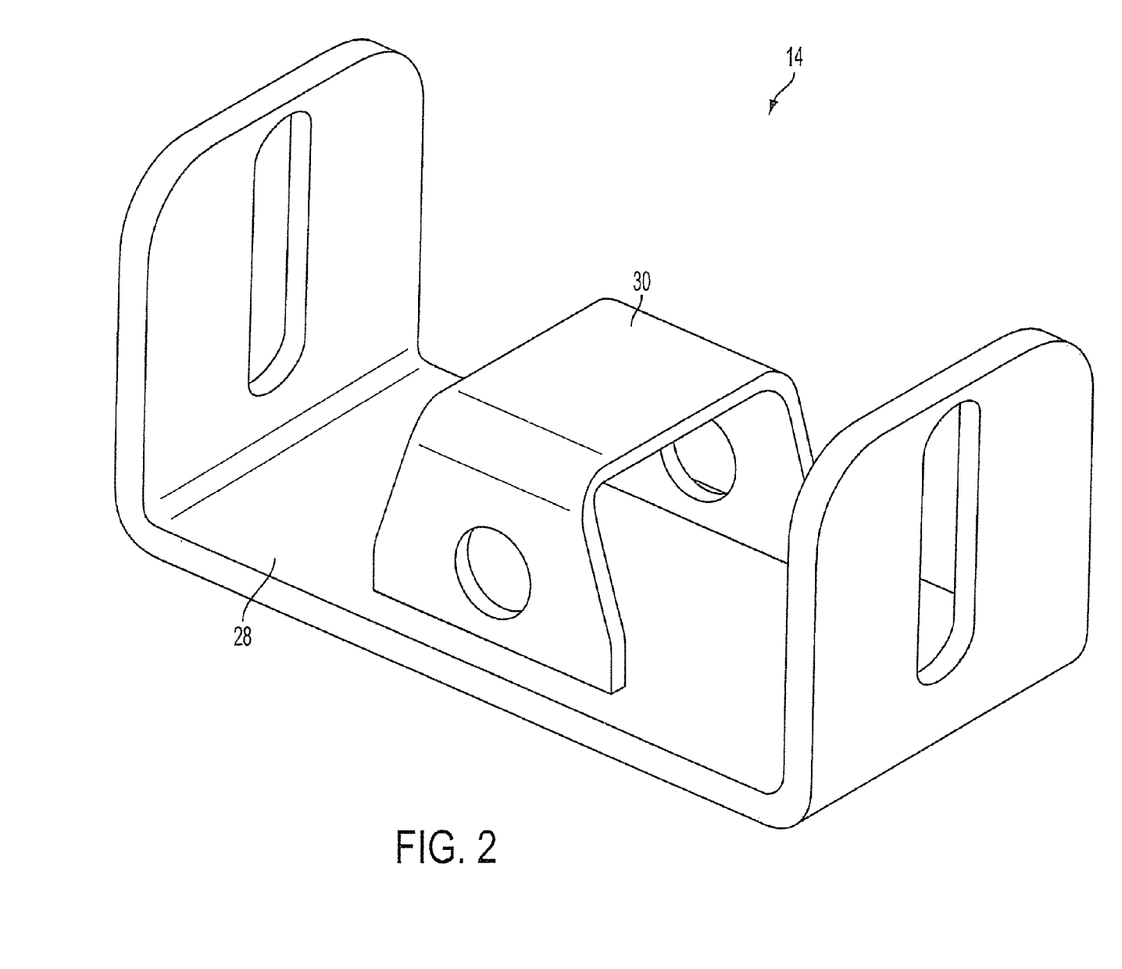
FIG. 2 is a perspective view of a length and height adjusting mechanism of an adaptor in accordance with the present invention.

FIG. 2 is a perspective view of a length and height adjusting mechanism 14 or 16 of the adaptor 10, and FIG. 3 is an enlarged view of the length and height adjusting mechanism 14 or 16 secured to an E-track cargo control system.

Each length and height adjusting mechanism 14 or 16 can include a base plate 28 and a pin bracket 30. As seen in FIG. 2, the base plate 28 can be have an upward facing U-shape having left, right, and bottom sides. The base plate 28 can be one contiguous piece of material. The pin bracket 30 can have a downward facing U-shape having left, right, and top sides. The pin bracket 30 can also be one contiguous piece of material.

The open-ended ends of the left and right sides of the pin bracket 30 can be welded or otherwise affixed to the upward facing bottom side of the base plate 28. A hole can disposed in each of the left and right sides of the pin bracket 30, and an elongated slot can be disposed in each of the left and right sides of the base plate 28.

The adaptor 10 can include first and second length and height adjusting mechanisms 14 and 16 placed at opposite ends of the crossbar 12 and secured to parallel tracks 100 and 100' of a cargo control system. The length and height adjusting mechanisms 14 and 16 can aid in adjusting the adaptor 10 for variances in the slots along the parallel tracks 100 and 100' of the cargo control system.

As best seen in FIG. 3, a rod 32 can extend through and past the holes of the pin bracket 30. First and second tie down hardware 34 and 36 known by those of skill in the art, for example, an E-track clip, and E-track clip with a ring, or an E-track clip with a spring clip, can be located near each end of the rod 32 extending through the pin bracket 30. The locations of the tie down hardware 34 and 36 are adjustable along the length of the rod 32, and a pin or clip 38 at one end of the rod 32 can secure the tie down hardware 34 at the desired location along the length of the rod 32.

The adjustability of the tie down hardware 34 and 36 along the length of the rod 32 can aid in adjusting the adaptor 10 for variances in slots along the tracks 100 and 100' of the cargo control system. That is, the adjustability of the tie down hardware 34 and 36 along the length of the rod 32 can provide for adjustability of the adaptor 10 along the length of the parallel tracks 100 and 100'. For example, a slot on one track 100 may not precisely align with a corresponding slot on the parallel track 100'. However, a user may want the adaptor 10 to be precisely perpendicular to the tracks 100 and 100' so that the wheel chock 110 or 120 or other cargo secured to the adaptor 10 is aligned in the desired manner relative to the tracks.

When tracks of a cargo control system are affixed to a floor or wall of a trailer or truck, there are often variances in the height of the tracks relative to the floor or wall. That is, the track can sit slightly above the floor, be recessed relative to the floor, or be flush-mounted with the floor. The width and height adjusting mechanisms 14 and 16 can aid in adjusting the adaptor for height variances of the adaptor 10 relative to the tracks 100 and 100' of the cargo control system.

For example, in some embodiments, a cap 15 can be welded or affixed to the end of the crossbar 12, and the cap 15 can have a centrally located hole disposed therein. A bolt 17 can secure one side of the base plate of a length and height adjusting mechanism 14 or 16 to crossbar 12. For example, the bolt 17 can secure the left side of the base plate 28 of the height adjusting mechanism 14 to the crossbar 12.

As best seen in FIG. 3, the left and right sides of the base plate 28 can have elongated slots disposed therein. The bolt 17 can be directed from the inner U of the base plate 28 through the slot disposed in the side of the base plate 28 and into the hole disposed in the cap 15 on the end of the crossbar 12. The head of the bolt 17 can remain within the inner U of the base plate 28.

The elongated slot disposed in the side of the base plate 28 can allow for the vertical adjustability of the adaptor 10, and specifically the crossbar 12, relative to the track 100'. The bolt 17 can slide in a vertical direction along the length of the slot to adjust for the height variance in the track 100' relative to the floor or wall. The bolt 17 can adjust in the vertical direction until the horizontal second parts 18", 20", and 22" of the width adjusting mechanisms 18, 20, and 22 are at the appropriate height relative to the floor of the trailer or truck.

As explained above, the adaptor shown and described herein can be used in connection with all types of cargo control systems, including E-track systems, A-track systems, and O-track systems. The principles of the adaptor remain the same whether used in connection with an E-track system, and A-track system, an O-track system, or any other type of cargo control system. For example, the adaptor 10 can be adjusted length-wise, width-wise, and height-wise in the same manner as described above to accommodate variances in the tracks of the cargo control system.

Figure 7:
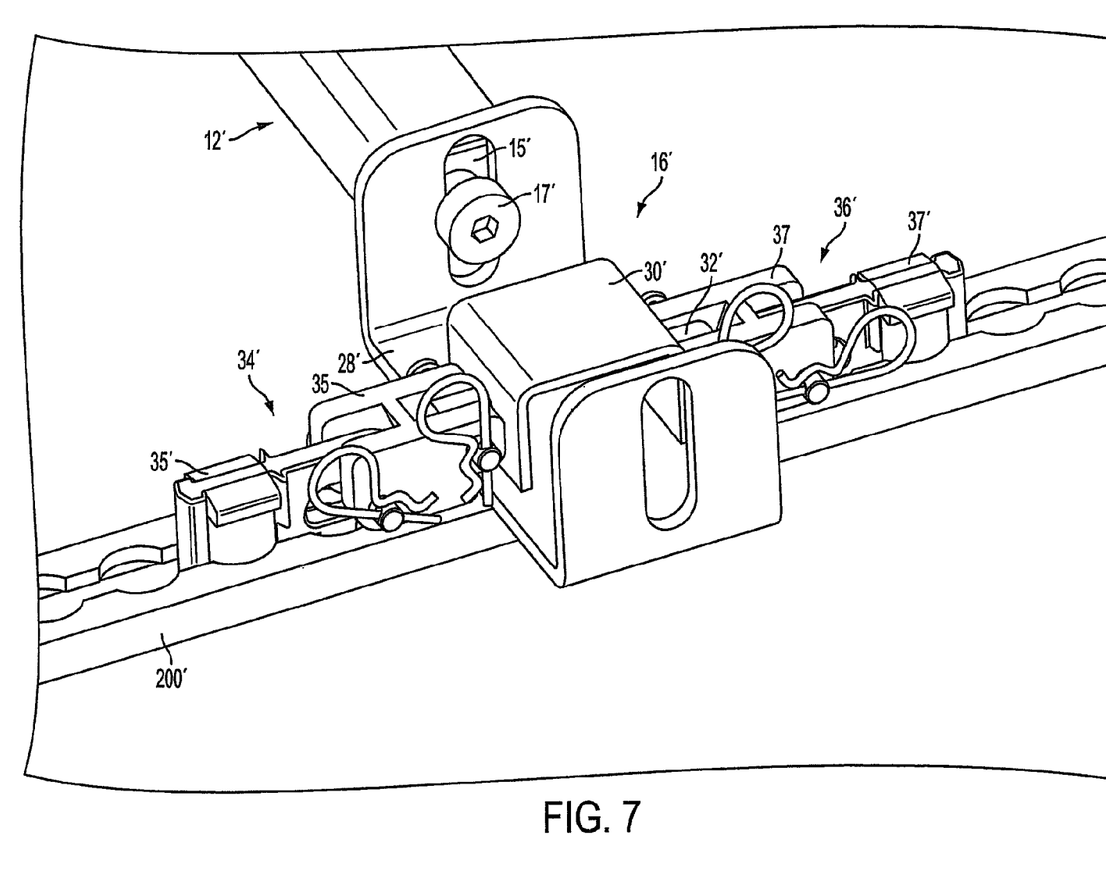
FIG. 7 is an enlarged view of a length and height adjusting mechanism of an adaptor in accordance with the present invention secured to an A-track cargo control system.

FIG. 7 is an enlarged view of a length and height adjusting mechanism 16' of an adaptor secured to an A-track cargo control system. As seen in FIG. 7, the principles of the adaptor 10' remain the same even when secured to an A-track system. However, the length and height adjusting mechanism 16' can be adapted for securing to he A-track.

For example, a rod 32' can extend through and past the holes of the pin bracket 30'. First and second tie down hardware 34' and 36' can be located near each end of the rod 32' extending through the pin bracket 30'. As seen in FIG. 7, each tie down hardware 34' and 36' can include a first bracket 35 and 37 and a second bracket 35' and 37'.

First ends of the first brackets 35 and 37 of each tie down hardware 34' and 36' can be secured to opposing ends of the rod 32' by, for example, pins or other hardware known by those of skill in the art. Second ends of the first brackets 35 and 37 can be secured to first ends of the second brackets 35' and 37' by, for example, pins or other hardware known by those of skill in the art.

Second ends of the second brackets 35' and 37' can then be secured to the A-track 200' of the cargo control system. In embodiments of the present invention, the tie down hardware 34' and 36', and/or the second brackets 35' and 37' can include A-track clips, A-track clips with rings, A-track clips with spring clips or any other hardware known by those of skill in the art for securing cargo to an A-track system.

The locations of the tie down hardware 34' and 36', including the first brackets 35 and 37, can be adjustable along the length of the rod 32' to aid in adjusting the adaptor for variances in the slots (circular and/or rectangular) along the track 200'.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed:

1. An adaptor for cargo control systems comprising:
a crossbar;
first and second length and height adjusting mechanisms; and
first and second width adjusting mechanisms,
wherein first and second ends of the crossbar are affixed to a respective one of the first and second length and height adjusting mechanisms with an affixing mechanism that can slide along the respective first and second length and height adjusting mechanism, and
wherein the first and second width adjusting mechanisms are affixed to the crossbar along a length of the crossbar.

2. The adaptor of claim 1 wherein the crossbar includes first and second slidably engaging bars.

3. The adaptor of claim 2 wherein the length of the crossbar is adjusted by sliding the first slidably engaging bar into or out of the second slidably engaging bar.

4. The adaptor of claim 1 wherein each of the first and second length and height adjusting mechanisms includes a base plate and a pin bracket.

5. The adaptor of claim 1 wherein the affixation mechanism includes a bolt.

6. The adaptor of claim 4 wherein each of the base plates includes an elongated slot, and wherein the affixation mechanism slides in a vertical direction along the respective elongated slot.

7. The adaptor of claim 1 further comprising a third width adjusting mechanism affixed to the crossbar along the length of the crossbar.

8. The adaptor of claim 1 wherein each of the width adjusting mechanisms includes a first part that circumscribes the crossbar and a second part that extends below and perpendicular to the crossbar.

9. The adaptor of claim 8 wherein each of the width adjusting mechanisms is adjustable along the length of the crossbar.

10. The adaptor of claim 8 wherein the second part of the width adjusting mechanism is capable of securing a wheel chock thereto.

11. An adaptor for cargo control systems comprising:
a crossbar;
first and second length and height adjusting mechanisms;
first and second width adjusting mechanisms; and
first and second tie down hardware,
wherein the first and second length and height adjusting mechanisms are affixed to respective first and second ends of the crossbar,
wherein the first and second width adjusting mechanisms are affixed to the crossbar along a length of the crossbar,
wherein at least a portion of each of the first and second width adjusting mechanisms circumscribes at least a portion of the crossbar,
wherein at least one of the first and second width adjusting mechanisms is adjustable along the length of the crossbar, and
wherein the first and second tie down hardware are removably affixed to the respective first and second length and height adjusting mechanisms for securing the first and second length and height adjusting mechanisms to respective tracks of a cargo control system.

12. The adaptor of claim 11 wherein each of the first and second tie down hardware includes a first bracket for affixing to the respective length and height adjusting mechanisms, and a second bracket, wherein a first end of the second bracket affixes to the respective length and height adjusting mechanisms, and a second end of the second bracket affixes to the respective tracks of the cargo control system.

* * * * *